United States Patent [19]
Wijmans et al.

[11] Patent Number: 5,538,640
[45] Date of Patent: *Jul. 23, 1996

[54] PERVAPORATION APPARATUS AND PROCESS

[75] Inventors: Johannes G. Wijmans, Menlo Park; Juergen Kaschemekat; Richard W. Baker, both of Palo Alto, all of Calif.

[73] Assignee: Membrane Technology and Research, Inc., Menlo Park, Calif.

[*] Notice: The term of this patent shall not extend beyond the expiration date of Pat. No. 5,417,841.

[21] Appl. No.: 280,006

[22] Filed: Jul. 25, 1994

Related U.S. Application Data

[63] Continuation of Ser. No. 813,194, Dec. 23, 1991, Pat. No. 5,417,847.

[51] Int. Cl.[6] ................................................ B01D 61/36
[52] U.S. Cl. .................................... 210/640; 210/140
[58] Field of Search ........................... 210/640, 257.2, 210/86, 138, 140, 143, 96.2

[56] References Cited

U.S. PATENT DOCUMENTS 5,417,847  5/1995  Wijmans et al. ................ 210/86

FOREIGN PATENT DOCUMENTS 3016006  1/1988  Japan ................ 210/640

*Primary Examiner*—Frank Spear
*Attorney, Agent, or Firm*—J. Farrant

[57] ABSTRACT

A pervaporation apparatus and process adapted to handle a diverse range of feed stream compositions and volumes. The apparatus includes a pervaporation unit and condenser, one or more tanks and a control system to direct liquid flows within the apparatus according to the chosen processing scheme. The apparatus and process can achieve separation performance comparable to a one-stage, two-stage, two-step or more complicated pervaporation system, including those in which two-phase permeates are produced.

19 Claims, 14 Drawing Sheets

FIRST OPERATION

SECOND OPERATION

THIRD OPERATION

FOURTH OPERATION

FIRST OPERATION

SECOND OPERATION

DRAIN

THIRD OPERATION

FOURTH OPERATION

FIRST OPERATION

SECOND OPERATION

THIRD OPERATION

FIRST OPERATION

SECOND OPERATION

THIRD OPERATION

FIRST OPERATION

SECOND OPERATION

DRAIN

THIRD OPERATION

FOURTH OPERATION

5,538,640

PERVAPORATION APPARATUS AND PROCESS

This is a continuation of application Ser. No. 813,194, filing date Dec. 23, 1991, now Pat. No. 5,417,847.

FIELD OF THE INVENTION

The invention relates to pervaporation. More particularly, the invention relates to a pervaporation apparatus and process adapted to handle a diverse range of feed stream compositions and volumes.

BACKGROUND OF THE INVENTION

Pervaporation is a separation technology that is beginning to achieve commercial success. The pervaporation process itself has been known since the 1950s, and is described, for example, in U.S. Pat. Nos. 2,913,507 and 2,953,502 to Binning et al. Organic-selective pervaporation is described in a general way in U.S. Pat. No. 4,218,312 to Perry. Despite the theoretical knowledge embodied in these patents, many years elapsed before commercially viable pervaporation systems could be contemplated, because the technology to make high performance membranes and modules had not been developed. This technology has begun to emerge in the last few years.

The design of a pervaporation system depends on the nature of the stream to be treated, the desired compositions of the permeate and residue streams and the properties of the available membranes. One pass through a single bank of pervaporation modules may be adequate to achieve a sufficiently concentrated permeate and a sufficiently depleted residue, so long as the starting concentration is within a particular range, and so long as the membrane is intrinsically capable of that level of separation. It is frequently the case, however, that either the permeate stream or the residue stream emerging from the module bank, or both, will need to pass through a second module bank before reaching the target concentration. Often, recycling of streams between module banks will be necessary. It is generally necessary, therefore, to make a custom-designed system for each application. For large industrial plants with feed streams of a constant composition and steady, high-volume flow rates, this is acceptable. To date, however, the benefits of pervaporation as an efficient separation technology have not been readily available to potential users who do not fit this description, particularly small industries, those with streams whose flow rate and/or composition is variable, or those whose stream flow rates are low. Such potential users may not have the resources of large plants to pool, adjust or pretreat feed streams to bring them within tight starting parameters for treatment. They may also encounter problems using other separations and waste-treatment technologies, such as distillation, carbon adsorption, incineration, air or steam stripping, because of the size, complexity, inflexibility or expense of the equipment, and recently, because of emissions control legislation. There exists, therefore, a need for separation equipment that offers flexibility from a standard design and that is within the economic and technical resources of relatively small companies.

SUMMARY OF THE INVENTION

The invention is a pervaporation apparatus and process adapted to handle a diverse range of feed stream compositions and volumes.

The aspects of the invention can be made clear by comparison with existing pervaporation technology.

A pervaporation unit provides a membrane that is selectively permeable to at least one component of a solution. When an appropriate driving force is provided, that component permeates the membrane preferentially and emerges as a vapor on the permeate side. The driving force is provided by creating a partial pressure difference between the feed and permeate sides of the membrane. This may be done in a variety of ways, including drawing a vacuum on the permeate side, condensing the permeate, heating the feed, using an inert sweep gas on the permeate side and combinations of these. A condenser is often attached to the permeate side of the unit to liquify the component-enriched permeate vapor. Component-depleted solution is withdrawn as a liquid residue from the feed side of the membrane. Pervaporation can be used to remove water from organic solutions, to remove an organic compound from an aqueous solution, or to separate one organic compound from another. The separation performance achieved by the unit depends on a number of factors, including the intrinsic separation capability of the membrane, the operating conditions and the characteristics of the feed stream to be treated. For some separations, a single treatment is adequate. A one-stage pervaporation system, containing a single bank of one or more membrane modules, can be used to perform the separation. In some cases, however, the permeate that can be produced by a single treatment is not sufficiently enriched in the selectively permeating component. The permeate stream is then passed to a second bank of membrane modules for further enrichment. A pervaporation system thus equipped is commonly called a two-stage system. A system with two or more stages is also called a multistage system. In some cases, the residue left after a single treatment is not sufficiently depleted in the selectively permeating component. The residue stream is then passed to a second bank of membrane modules for further depletion. A pervaporation system thus equipped is commonly called a two-step system. A system with two or more steps is also called a multistep system. Multistage and multistep system designs can provide recirculation of partially processed streams, so that only one final permeate and one final residue stream will be produced. A heater or heat exchanger is often provided between module banks to maintain the temperature of the feed to the various steps or stages. A conventional pervaporation system is designed as a one-stage, two-stage or two-step system, to use a particular membrane, and to perform a specified separation under a defined set of operating conditions.

In contrast, the pervaporation apparatus and process of the invention can be designed to behave as a one-stage system, a two-stage system, a two-step system or other combinations. Thus a single apparatus can take the place of multiple pervaporation systems and offers flexibility in being able to handle a variety of different streams, or a stream whose composition or flow rate is too variable for a conventional system.

This flexibility is achieved by a combination of:

a) a one-stage pervaporation unit and condenser, b) one or more tanks, c) a control system to direct liquid flows in the apparatus according to various processing schemes.

The most preferred apparatus includes a holding tank for liquid awaiting pervaporation treatment, a process tank in which liquid undergoing pervaporation treatment is contained, a second process tank that can be switched into the pervaporation circuit as an alternative to the main process tank, a concentrate tank for holding liquid that has been subjected to pervaporation treatment, a pervaporation unit, a condenser and a programmable control system. Optionally, the apparatus may include a heater to maintain the temperature of the feed solution circulating through the pervaporation unit. Such an apparatus has the greatest flexibility in performing the functions previous associated with multistage and multistep systems and in handling different types of feed streams.

However, useful embodiments of the invention are possible with fewer components. For example, the concentrate tank may be dispensed with and the enriched product stream may be discharged from the apparatus directly. The second process tank may be dispensed with and the apparatus can still perform the functions previously associated with multistep operations, but not multistage. The computerized control system may be dispensed with and, for example, a set of sensor-regulated, time-regulated or manual valves could be used to perform the control function.

The apparatus may include or be attached to a decanter system to separate permeate liquids that undergo phase separation after pervaporation. Other separation units, such as solvent extraction, distillation, adsorption or absorption units might also be incorporated to provide further purification of the permeate in appropriate situations.

The features of the apparatus include the following:

1. A single apparatus can behave as a single-stage, multistep system, multistage system or combinations of these.
2. A single apparatus can handle feed streams of different compositions.
3. A single apparatus can deliver different residue and permeate compositions by varying the timing of the process steps.
4. A single apparatus can handle feed streams of different flow rates.
5. The apparatus can handle feed flows that would be too small for conventional pervaporation treatment.
6. There is only one bank of membrane modules, so multiple heaters or heat exchangers are not needed.
7. Problems associated with reduced driving force at the residue end of the modules, encountered with conventional systems, are reduced or eliminated.

The invention also includes pervaporation processes, carried out as a series of process steps, that achieve a separation performance comparable to that achieved by using a two-stage, two-step system or more complicated system, but without the use of such a system.

It is an object of the invention to provide a pervaporation apparatus that can perform as a single-stage system or a multistep system.

It is an object of the invention to provide a pervaporation apparatus that can perform as a single-stage system or a multistage system.

It is an object of the invention to provide a pervaporation apparatus that can handle a diversity of feed streams.

It is an object of the invention to provide a pervaporation apparatus that can handle small-volume feed streams.

It is an object of the invention to provide a pervaporation apparatus that can handle feed streams whose composition and/or flow rate fluctuates with time.

It is an object of the invention to provide a pervaporation process that can achieve a separation performance comparable to that achieved by using a two-stage system, but without the use of such a system.

It is an object of the invention to provide a pervaporation process that can achieve a separation performance comparable to that achieved by using a two-step system, but without the use of such a system.

Other objects and advantages of the invention will be apparent from the description of the invention to those of ordinary skill in the art.

It is to be understood that the above summary and the following detailed description are intended to explain and illustrate the invention without restricting its scope. For simplicity of discussion, the description of the invention that follows has been written for the situation where an organic compound is to be removed from water. However, the invention should be construed as pertaining equally to removal of one organic from another, or of water from an organic stream.

DETAILED DESCRIPTION OF THE INVENTION

Figure 1:
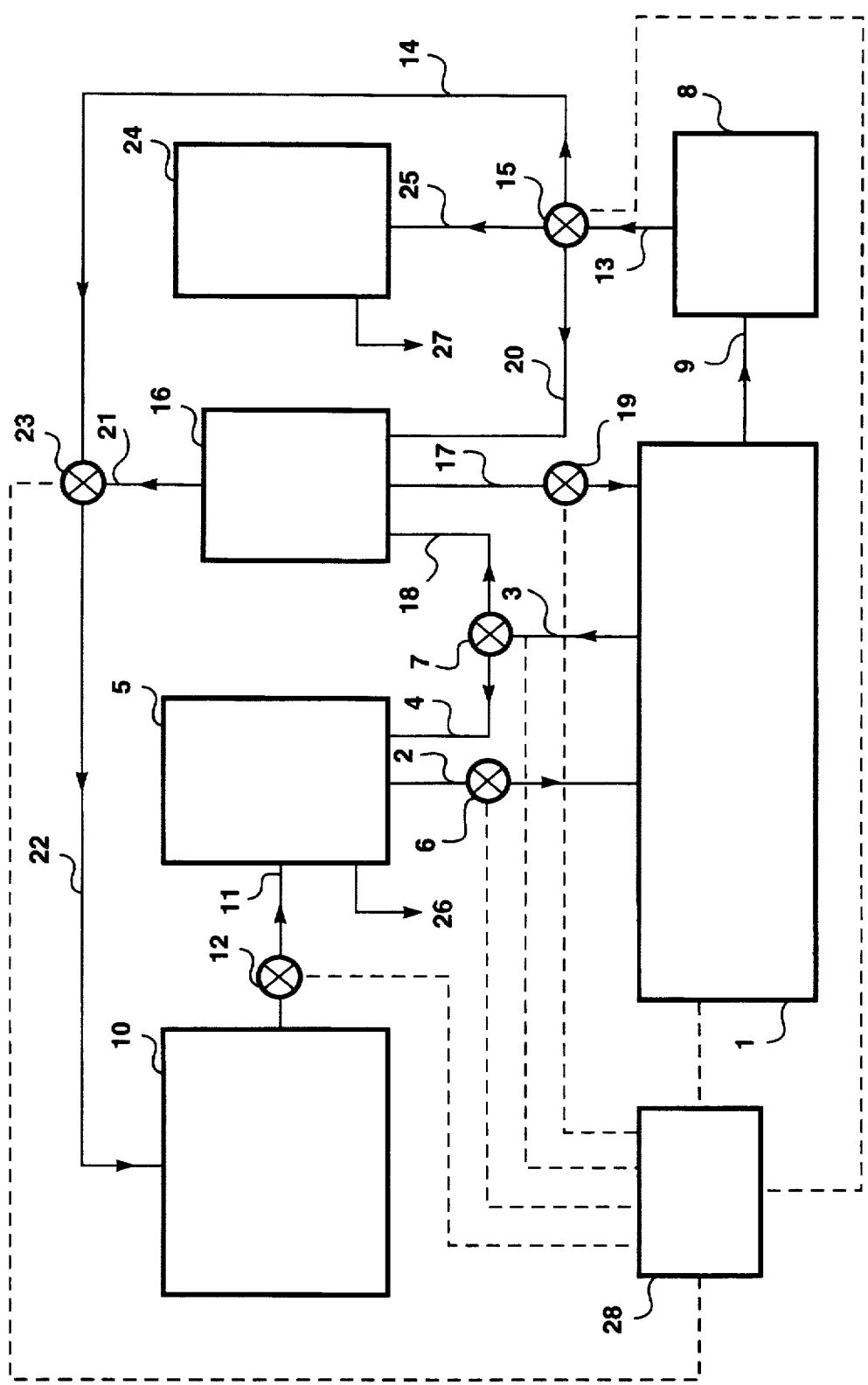
FIG. 1 is a schematic showing a preferred embodiment of the invention.

A preferred embodiment of the apparatus of the invention is shown in the form of a block diagram in FIG. 1. Referring now to this figure, the apparatus comprises the following elements:

a) a pervaporation unit,
b) a condenser,
c) a holding tank,
d) a first process tank,
e) a second process tank,
f) a concentrate tank,
g) a process control system.

The pervaporation unit 1 contains one or more membrane modules housing membrane selectively permeable to the component to be separated by pervaporation. For separating an organic compound from water, the following membrane materials, among others, might be used: nitrile rubber, neoprene, polydimethylsiloxane (silicone rubber), chlorosulfonated polyethylene, polysilicone-carbonate copolymers, fluoroelastomers, plasticized polyvinylchloride, polyurethane, cis-polybutadiene, cis-polyisoprene, poly(butene-1), polystyrene-butadiene copolymers, styrene/butadiene/ styrene block copolymers, styrene/ethylene/butylene block copolymers, polyesteramides, and block copolymers of polyethers and polyesters. For separating water from an organic compound, the following membrane materials, among others, might be used: polyvinylalcohol, polysulfone, cellulose and derivatives, such as cellulose diacetate, cellulose triacetate, cellulose nitrate and ethylcellulose, chitosan, crosslinked alginic acid, and ion-exchange membranes such as the Nafion range from Du Pont. For separating two organic compounds, the following membrane materials, among others, might be used: polyamides, cellulose and derivatives, such as cellulose diacetate, cellulose triacetate, cellulose nitrate and ethylcellulose.

The membrane may take the form of a homogeneous membrane, a membrane incorporating a gel or liquid layer, or any other form known in the art. Two types of membrane are preferred for use in the invention. The first is a composite membrane comprising a microporous support, onto which the permselective layer is deposited as an ultrathin coating. Composite membranes are preferred when a rubbery polymer is used as the permselective material. The second is an asymmetric membrane in which the thin, dense skin of the asymmetric membrane is the permselective layer. Both composite and asymmetric membranes are known in the art. References that teach the production of such membranes include U.S. Pat. Nos. 2,243,701; 4,553,983; 4,230,463; and 4,840,646.

The form of the module containing the membrane may be any of the forms known in the membrane separation arts, including, for example, plate-and-frame modules, hollow-fiber modules and spiral-wound modules. Plate-and-frame module design and construction is discussed, for example, in U.S. Pat. No. 4,695,380. The preparation of spiral-wound modules is described, for example, in U.S. Pat. No. 3,966,616. The preparation of hollow-fiber membranes and modules is described, for example, in U.S. Pat. Nos. 3,798,185 and 4,230,463.

The pervaporation unit contains one pervaporation module or a bank of modules. On the feed/residue side, the unit in connected, via lines 2, 3 and 4, in a loop with the first process tank 5. The loop enables liquid to flow from the first process tank, across the feed side of the membrane and back to the first process tank. The liquid returning to the first process tank will be depleted in the selectively permeating component compared with the liquid flowing from the tank to the membrane. Liquid flow in the loop can be controlled by valves 6 and 7. In pervaporation, transport through the membrane is induced by maintaining the vapor pressure on the permeate side of the membrane lower than the vapor pressure of the feed liquid. The vapor pressure on the permeate side can be reduced in several ways, for example, by drawing a vacuum on the permeate side of the membrane, by sweeping the permeate side to continuously remove permeating vapor, or by cooling the permeate vapor stream to induce condensation. The feed solution may also be heated to raise the vapor pressure on the feed side. In the embodiment of FIG. 1, membrane permeation is maintained by chilling and condensing the permeate by passing it through condenser 8, the inlet to which is connected to the permeate side of the pervaporation unit by line 9. Within the scope of the invention, any method of creating a pressure difference could be used alone or in combination with condensation to create the driving force. Thus the condenser could be replaced by or supplemented with a liquid ring pump or other type of vacuum pump, by a Roots blower, by a sweep gas on the permeate side, etc.

A holding tank 10 provides storage of liquid awaiting treatment by pervaporation. The holding tank may be used for raw liquid that has not yet passed through the pervaporation unit. The holding tank is connected to the first process tank by line 11. Liquid flow through line 11 is controlled by valve 12. A pump may also be included in line 11. In some processing schemes, such as those described below, the holding tank may also be used to store liquid awaiting a second or further treatment in the pervaporation unit. The holding tank is connected to condenser 8 at outlet 13 by lines 14 and 22, so that liquid from the permeate side may be returned for additional processing. Liquid flow into line 14 is controlled by valve 15. A pump may also be included in line 14. The embodiment of FIG. 1 shows a single holding tank. Within the scope of the invention, however, more than one holding tank could be used to hold raw and processed liquids separately if desired.

A second process tank 16 is connected, by lines 17, 3 and 18, in a loop with the pervaporation unit. The loop enables liquid to flow from the second process tank, across the feed side of the membrane and back to the second process tank. Liquid flow in the loop can be controlled by valves 19 and 7. The second process tank is connected by line 20 to condenser 8 at outlet 13, so that liquid from the permeate side may be returned for additional processing. Liquid flow into line 20 is controlled by valve 15. A pump may also be included in line 20. The second process tank is connected by lines 21 and 22 to the holding tank 10. Liquid flow through lines 21 and 22 is controlled by valve 23. A pump may also be included in lines 21 or 22.

A concentrate tank 24 is connected to condenser outlet 13 by line 25. Permeate liquid may be passed to the concentrate tank for collection. Liquid flow into line 25 is controlled by valve 15. A pump may also be included in line 25. Tap or line 27 from concentrate tank 24 enables component-enriched end product to be withdrawn from the apparatus. Tap or line 26 enables component-depleted end product to be removed from the apparatus. Tap or line 26 is shown as a drain from the first process tank. Alternatively, it may be placed in any convenient position in the first liquid loop formed by the pervaporation unit, the first process tank and lines 2, 3 and 4.

Operation of the apparatus is controlled by the process control system 28. Most preferably, the control system comprises a programmable controller, programmed to open and close valves and start and stop pumps that regulate liquid flow between elements of the apparatus. The pumps themselves may also serve as valves. Start-up and shutdown of the pervaporation unit may also be controlled by the process control system. The process control system is connected to valves 6, 7, 15, 19 and 23 and to the pervaporation unit. Any appropriate stimulus may be used to control the operation of the valves. For example, the process control system may include sensors connected to the tanks to monitor the concentrations and/or levels of liquids in one or more of the first process tank, the second process tank and the concentrate tank, or it may be programmed for timed control of the valves. Preferably the process control system is programmed with at least the control logic necessary for the apparatus to carry out separation operations equivalent to those that would previously have been carried out by a one-stage, a two-stage and a two-step pervaporation system. It is also desirable that the process control system permit operator input to allow the apparatus to be used in other nonstandard modes. Although most preferred, a programmable controller is not essential to the invention. It will be apparent to those of skill in the art that a large number of different types of control mechanism could achieve the necessary sequence of liquid transfer and processing steps. As nonlimiting examples, other possible mechanisms include:

(a) a nonprogrammable electronic controller "hard-wired" to carry out the required process sequences, (b) an electromechanical or mechanical controller. An example would be a controller incorporating one or more level switches, which changes the valve settings in response to the liquid levels in the several tanks, (c) individually operated valves that open and close in response to sensory input, at preset times or in response to some other stimulus, (d) manually operated valves.

Likewise start-up and shutdown of the pervaporation unit may be performed by the central process control system, by means of a separate control unit or manually.

Figure 2:
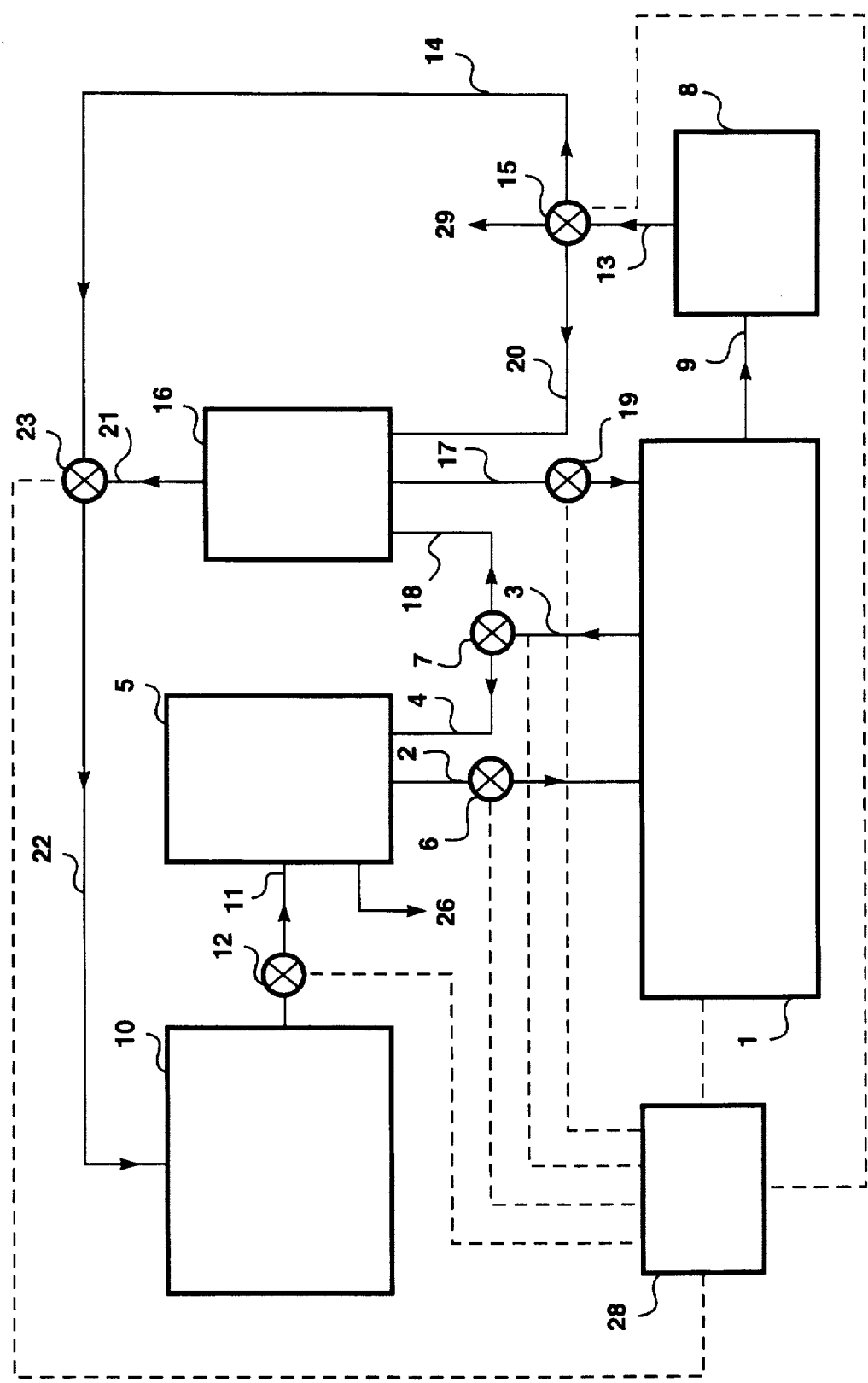
FIG. 2 is a schematic showing an alternative embodiment of the invention without a concentrate tank.

An alternative embodiment of the invention is shown in FIG. 2, where like numbered elements are the same as those in FIG. 1. In this case, however, a concentrate tank is not used. Component-enriched end product is simply withdrawn from the apparatus through tap or line 29.

Figure 3:
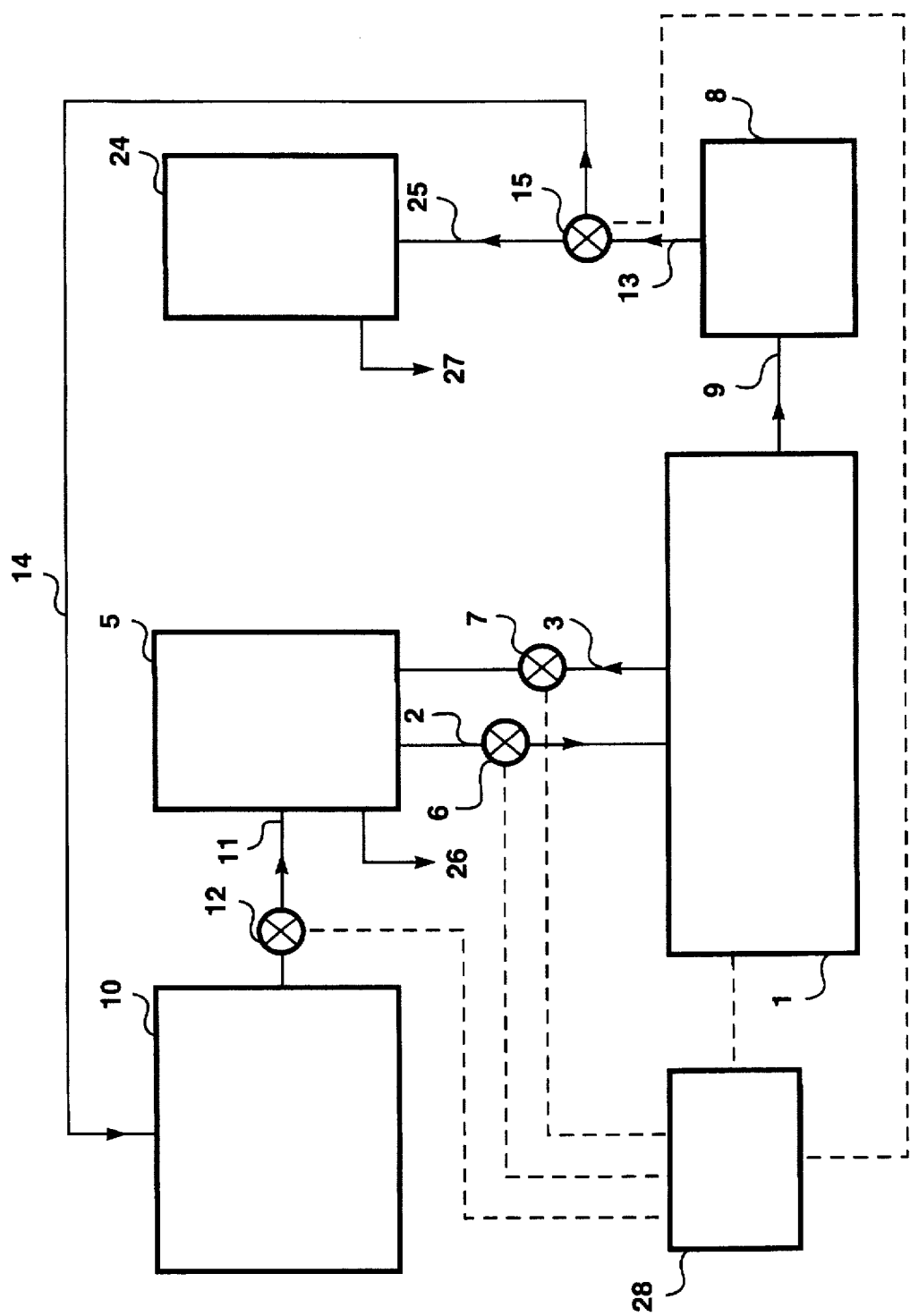
FIG. 3 is a schematic showing an alternative embodiment of the invention without a second process tank.

Another alternative embodiment of the invention is shown in FIG. 3, where like numbered elements are the same as those in FIG. 1. In this case a second process tank is not used. The apparatus of FIG. 3 would be useful in performing separation operations equivalent to those that would previously have been carried out by a one-stage, a two-step or a multistep pervaporation system.

Figure 4:
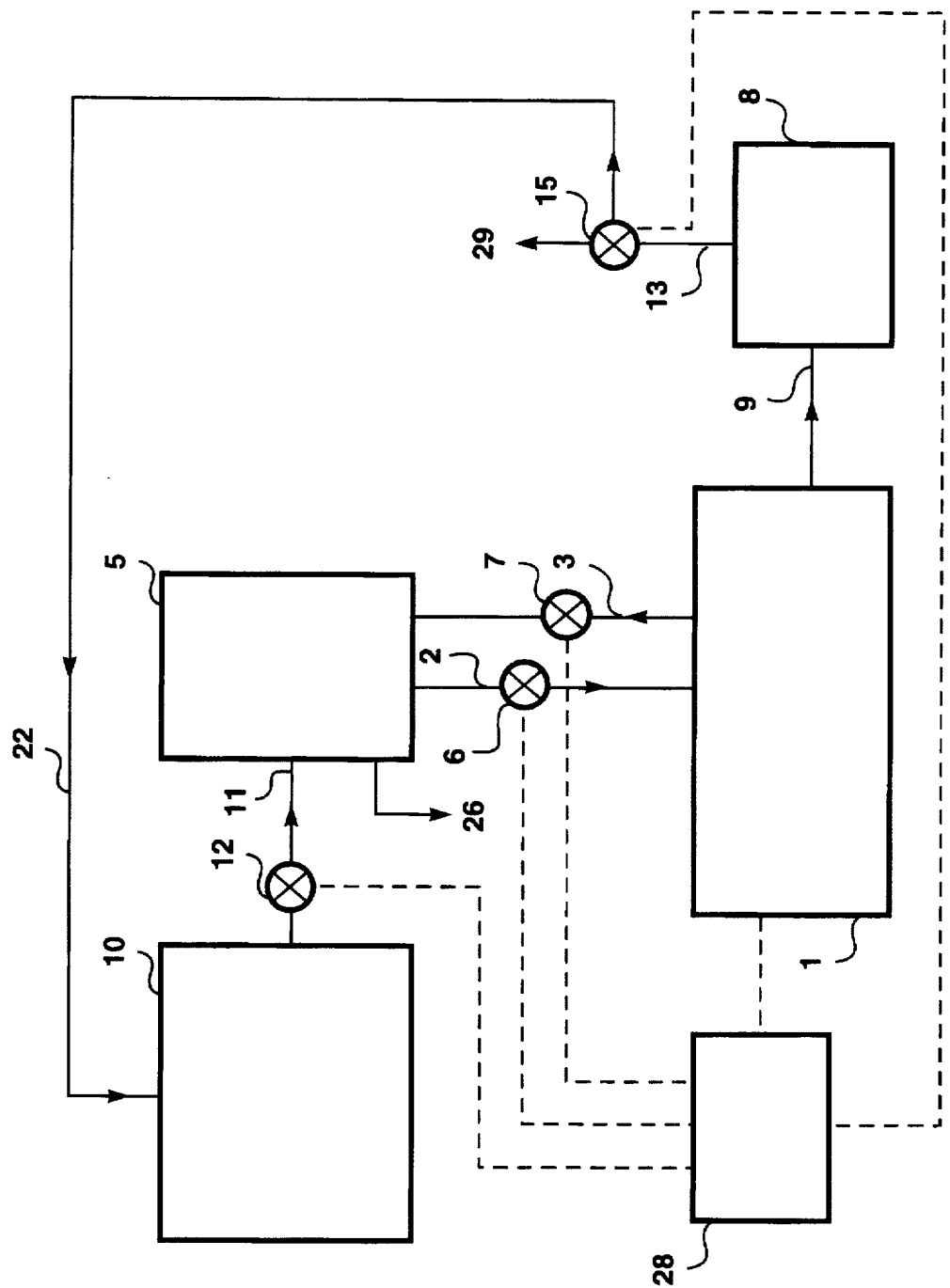
FIG. 4 is a schematic showing an alternative embodiment of the invention without a second process tank and a concentrate tank.
Figure 5A:
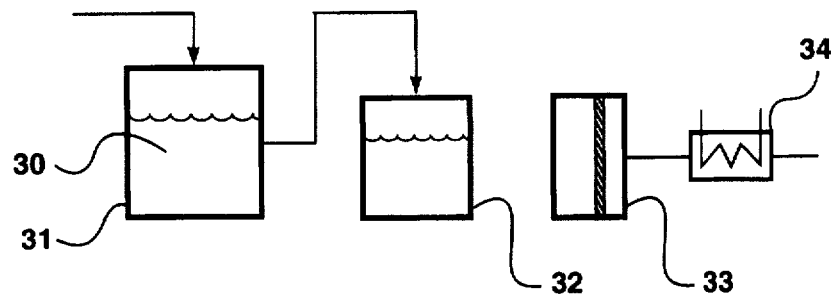
FIG. 5 is a process scheme showing a process that simulates a two-step process.
Figure 5B:
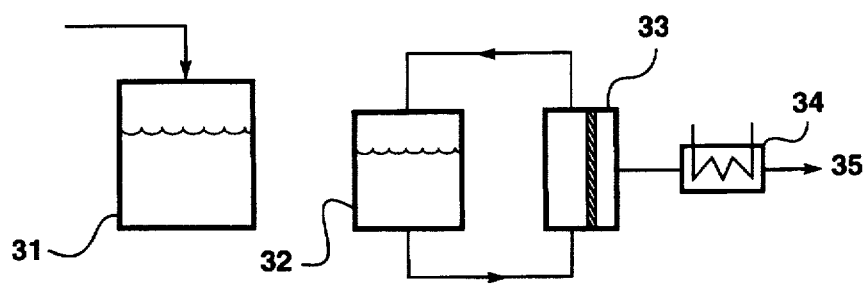
Figure 5C:
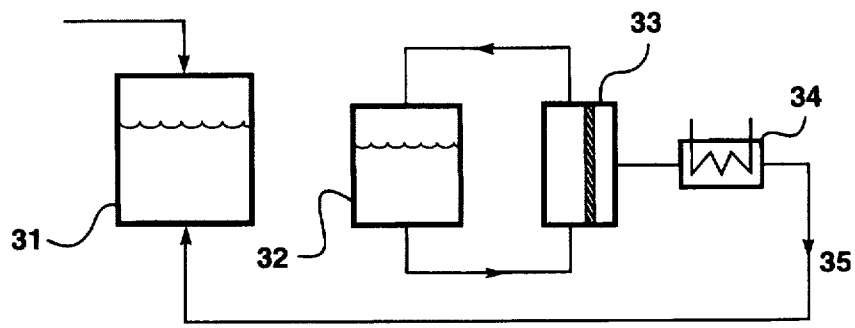
Figure 5D:
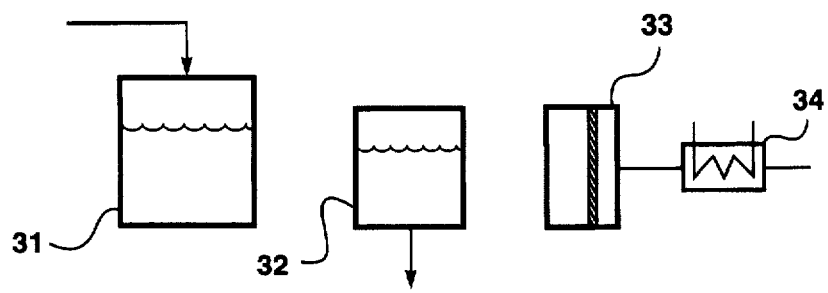
Figure 6A:
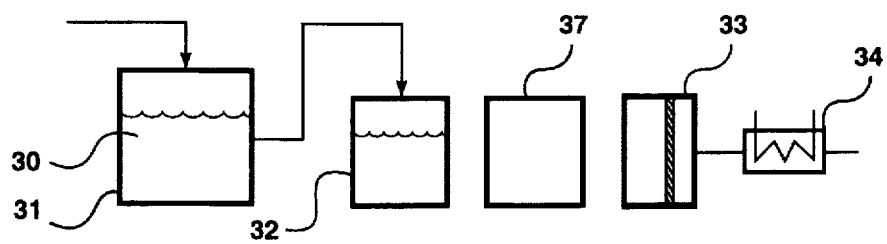
FIG. 6 is a process scheme showing a process that simulates a two-stage process.
Figure 6B:
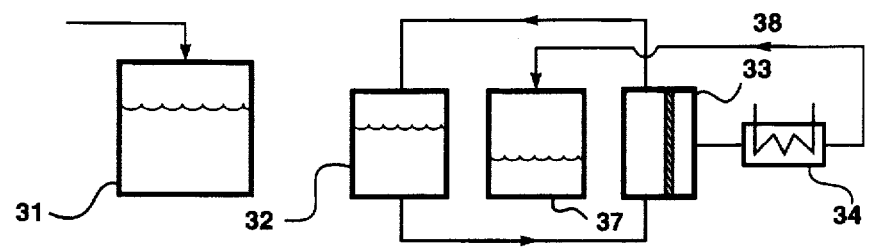
Figure 6C:
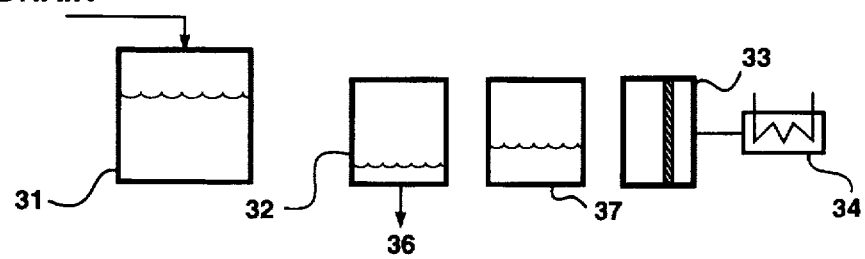
Figure 6D:
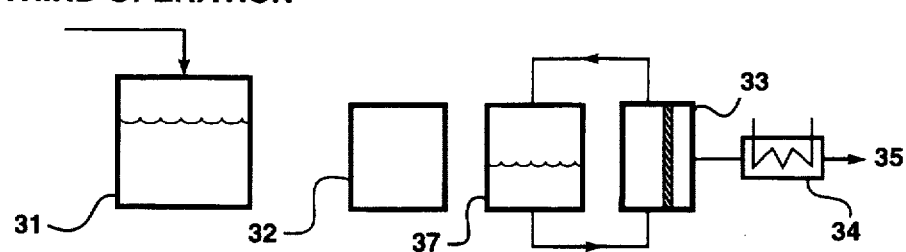
Figure 6E:
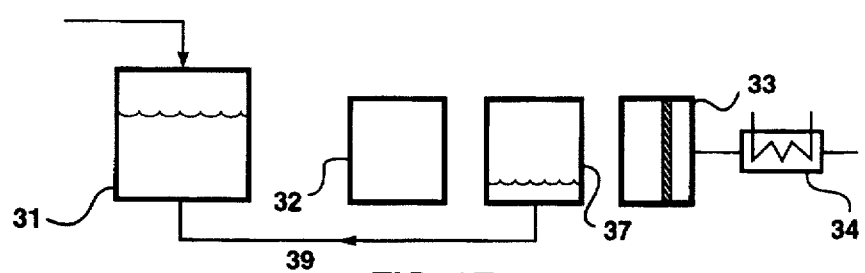

A fourth alternative embodiment is shown in FIG. 4, where like numbered elements are the same as those in FIG. 1. The apparatus of FIG. 4 performs the same functions as that of FIG. 3, except that a concentrate tank is not used and component-enriched end product is simply withdrawn from the apparatus through tap or line 29, as in FIG. 2.

Exemplary processes in accordance with the invention are shown in FIGS. 5–8. The separation process of FIG. 5 is equivalent to the separation process that could be carried out using a two-step pervaporation system. In other words, such a processing sequence is chosen when a once-processed permeate provides sufficient enrichment, but a twice-processed residue is required to provide sufficient depletion. In the first operation of FIG. 5, solution 30, containing a component to be separated, is transferred from the holding tank 31 to the process tank 32. The pervaporation unit 33 is started up and the permeate is liquified in condenser 34. As pervaporation proceeds, the permeate concentration of the preferentially permeating component drops from an initially very high concentration to a lower value. This second operation continues while the average total permeate concentration exceeds a chosen specification for the component-enriched end product. During the second operation, the feed concentration of the preferentially permeating component drops compared with the initial solution concentration, but is still at a value that is too high for the chosen specification of the component-depleted end product. At this point, further processing will improve the quality of the feed, but will cause undesirable dilution of the permeate 35. The third operation is, therefore, to discontinue discharge of the permeate. Processing continues, but with the condensed permeate now being collected in the holding tank. As pervaporation proceeds, the concentration of the permeate liquid in the holding tank falls, approaching the same concentration that was in the holding tank initially. Processing continues until the concentration of the solution in the process tank has reached the desired specification for the component-depleted end product. In the fourth operation, processing is discontinued and the component-depleted contents, 36, of the process tank are discharged. The cycle may then be repeated. It should be apparent from the above description that the same holding tank may be used for both raw, incoming solution and for the secondary permeate solution that is being returned for further treatment. Optionally, however, separate tanks could be provided for these two solutions within the scope of the invention. Most preferably, the transition from the second operation to the third operation is made such that both operations achieve the same degree of separation and take the same amount of time. As one representative, nonlimiting example of the above general description, suppose that the component concentration in the initial solution in the holding tank is 1%, and that it is required to reduce the concentration to 0.01%, that is 100-fold, while maintaining the permeate concentration at 10%. The second operation continues until the average total permeate concentration falls to 10%, at which point the feed concentration has fallen 10-fold, from 1% to 0.1%. The third operation continues until the feed concentration has dropped a further 10-fold, to the target value of 0.01%, at which point the processing stops and the component-depleted feed liquid is discharged. During the third operation, the permeate concentration collecting in the holding tank drops to around 1%. The process may then be repeated through another cycle. Thus the liquid in the holding tank during the first operation of subsequent cycles may be all raw, untreated liquid, may be only liquid returned from one of the other tanks for additional treatment or may be a mixture of raw and previously treated liquid. Alternatively, multiple holding tanks may be used.

The separation process of FIG. 6 is equivalent to the separation process that could be carried out using a two-stage pervaporation system. In other words, such a processing sequence is chosen when a once-processed residue provides sufficient depletion, but a twice-processed permeate is required to provide sufficient enrichment. In the first operation of FIG. 6, solution 30, containing a component to be separated, is transferred from the holding tank 31 to the first process tank 32. The pervaporation unit 33 is started up and the permeate is liquified in condenser 34. The liquid cycling through the first process tank becomes progressively depleted of the component to be removed. The permeate is not adequately enriched, so, during the second operation, the liquified permeate 38 is collected in second process tank 37. The second operation continues until the degree of depletion of the liquid in the first process tank is adequate. At any convenient point hereafter in the process cycle, the component-depleted contents, 36, of the first process tank are discharged. According to the cycle shown in FIG. 6, the first process tank is drained immediately the second operation has finished, but the draining could also be done at any time prior to refilling the first process tank with liquid to be treated. In the third operation, the pervaporation unit is run connected to the second process tank. The permeate 35 is liquified in condenser 34 and discharged. As pervaporation proceeds, the concentration of the liquid cycling through the second process tank falls to about the same concentration that was in the holding tank initially. When processing is complete, the contents, 39, of the second process tank are transferred to the holding tank. The cycle may then be repeated. As in the process of FIG. 5, the same holding tank may be used for both raw and previously treated solutions, alone or mixed. Also as in the process of FIG. 5, the transition from the second operation to the third operation should preferably be made such that both operations achieve the same degree of separation. For example, suppose that the component concentration in the initial solution in the holding tank is 0.1%, and that it is required to reduce the concentration to 0.01%, that is 10-fold, while maintaining the permeate concentration at 10%. The second operation continues until the residue concentration falls to the target value of 0.01%. The permeate concentration at this point is only 1%. The third operation continues until the permeate concentration is 10%, at which point the residue in the second process tank has a concentration of around 1%. The process may then be repeated through another cycle. Unlike the process of FIG. 5, the second and third operations do not take approximately the same amount of time, because the volume of permeate from the second operation is small compared with the volume of feed.

Figure 7A:
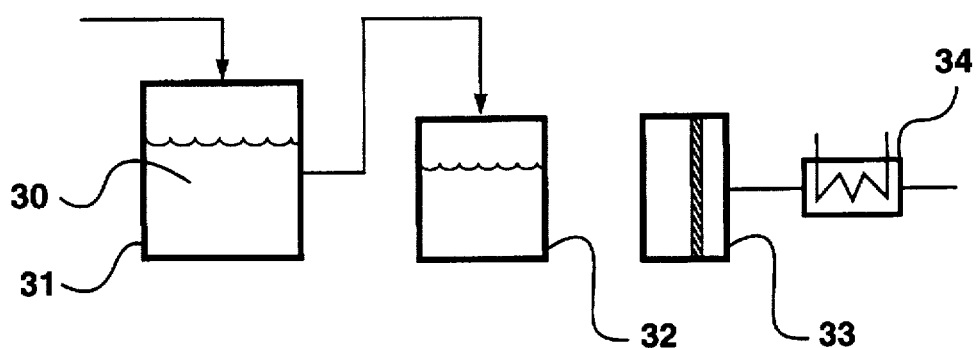
FIG. 7 is a process scheme showing a process that simulates a one-stage process.
Figure 7B:
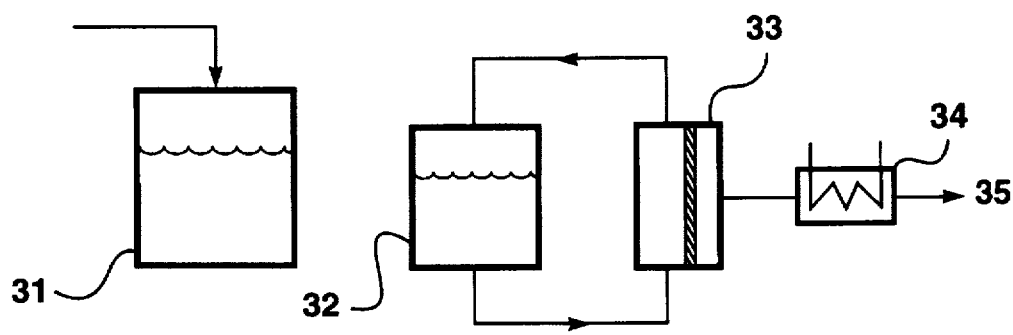
Figure 7C:
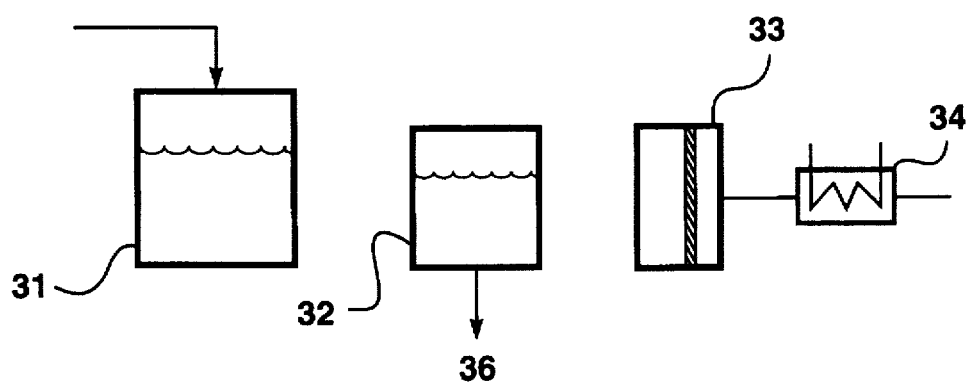

The separation process of FIG. 7 is equivalent to the separation process that could be carried out using a one-stage pervaporation system. In the first operation of FIG. 7, solution 30, containing a component to be separated, is transferred from the holding tank 31 to the process tank 32. The pervaporation unit 33 is started up and the permeate 35 is liquified in condenser 34 and discharged. The liquid cycling through the first process tank becomes progressively depleted of the component to be removed. The second operation continues until the degree of depletion of the liquid in the process tank is adequate or until the permeate falls below an acceptable concentration level. In the third operation, the component-depleted contents, 36, of the process tank are discharged. The cycle may then be repeated.

Figure 8A:
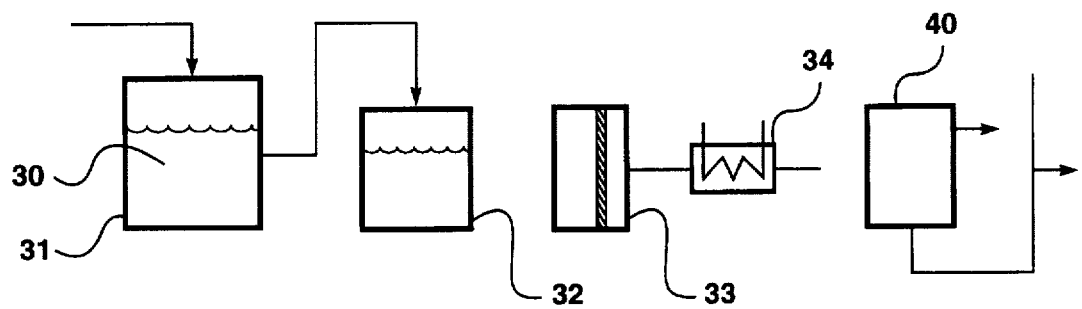
FIG. 8 is a process scheme including a decantation step.
Figure 8B:
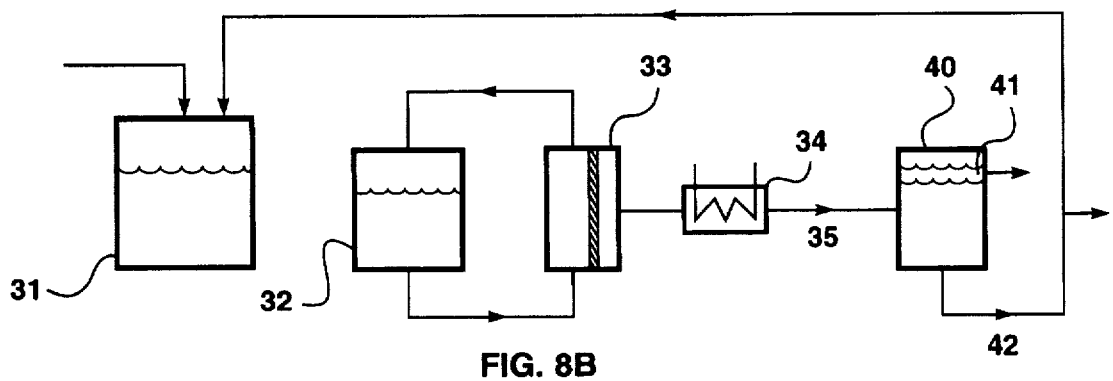
Figure 8C:
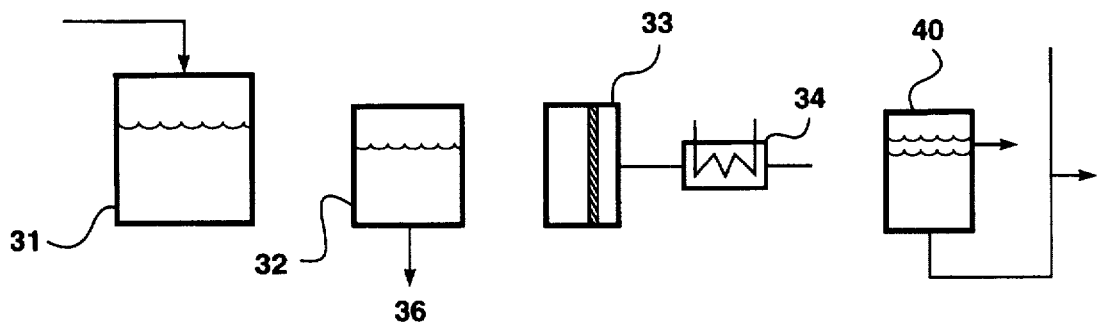
Figure 9A:
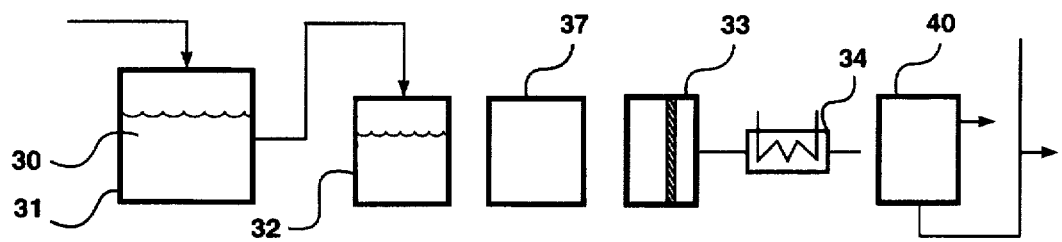
FIG. 9 is a process scheme including a decantation step in which two process tanks are used.
Figure 9B:
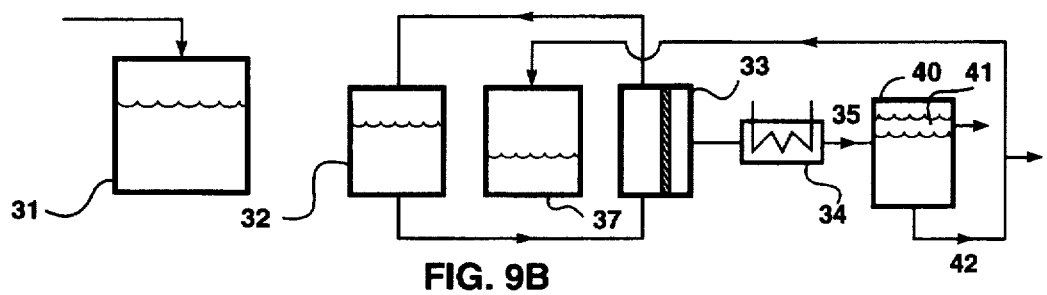
Figure 9C:
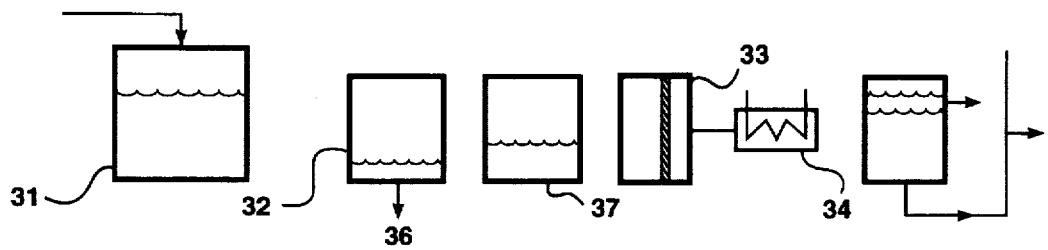
Figure 9D:
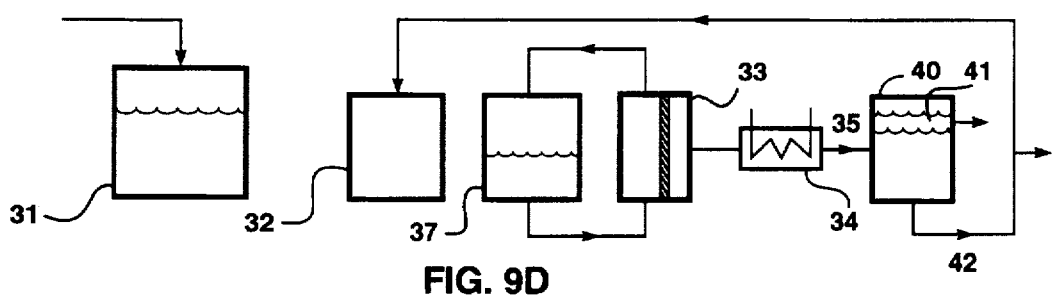
Figure 9E:
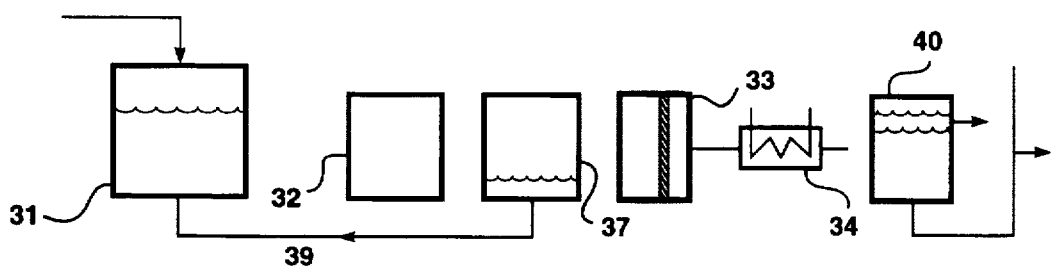

In the process schemes described above, the feed and permeate solutions are separated by pervaporation only. FIG. 8 shows a representative process scheme in which pervaporation is combined with decantation. Referring now to this figure, in the first operation solution 30, containing a component to be separated, is transferred from the holding tank 31 to the process tank 32. The pervaporation unit 33 is then started up and the permeate 35 is liquified in condenser 34 and passed to decanter 40. In the process scheme shown in the figure, the light phase 41 is the component-enriched product, which can be withdrawn as convenient. The heavy phase, 42, is returned to the holding tank for further processing. The liquid cycling through the process tank becomes progressively depleted of the component to be removed. The second operation continues until the degree of depletion of the liquid in the process tank is adequate or until the permeate falls below an acceptable concentration level. In the third operation, the component-depleted contents, 36, of the process tank are discharged. The cycle may then be repeated.

The process of FIG. 8 is very simple. A more complicated scheme is shown in FIG. 9. This scheme could be used, for example, when the heavy phase from the decanter is saturated with the component to be removed and it is undesirable to mix it directly with the raw incoming feed. In this case, the heavy phase from the decanter could be passed to a second process tank and subjected to an additional pervaporation step. Referring now to FIG. 9, in the first operation solution 30, containing a component to be separated, is transferred from the holding tank 31 to the first process tank 32. The pervaporation unit 33 is started up and the permeate 35 is liquified in condenser 34 and passed to decanter 40. The light phase 41 is the component-enriched product, which can be withdrawn as convenient. The heavy phase, 42, is saturated with the component and should not be mixed with the raw, incoming liquid. The heavy phase is collected in second process tank 37. This second operation continues until the degree of depletion of the liquid in the first process tank is adequate. At any convenient point hereafter in the process cycle, the component-depleted contents, 36, of the first process tank are discharged. According to the cycle shown in FIG. 9, the first process tank is drained immediately the second operation has finished, but the draining could also be done at any time prior to refilling the first process tank with liquid to be treated. In the third operation, the pervaporation unit is run connected to the second process tank. As before, the permeate 35 is liquified in condenser 34 and passed to decanter 40. The overflow, component-saturated, heavy phase from the decanter is collected in the first process tank. As pervaporation proceeds, the concentration of the liquid cycling through the second process tank falls to about the same concentration that was in the holding tank initially. When this has happened, processing is discontinued and the contents, 39, of the second process tank are transferred to the holding tank. Alternatively, the third operation could be continued until the contents of the second process tank were reduced to a concentration sufficiently depleted for direct discharge. In either case, the cycle may then be repeated. If the first process tank already contains saturated heavy phase, the contents of the holding tank would be passed to the second process tank for the next cycle.

It will be apparent to those of skill in the art that the teachings of the invention can include many pervaporation/decantation combinations other than those representative processes described above. Likewise, processes in which pervaporation is combined with other separation techniques, including distillation, solvent extraction, adsorption and absorption are contemplated.

The apparatus and processes of the invention have a number of beneficial features. As shown above, a single standard apparatus can carry out pervaporation processes that achieve the same separation performance as a one-stage, two-stage or two-step system. It will be apparent that by modifying the processing schemes, more complicated systems could also be mimicked. This feature is very important. Engineering design costs can be a significant fraction of the total system costs in custom-designed systems. To manufacture systems on a one-off basis is costly and inefficient. The invention provides opportunities for significant savings in design and manufacturing costs.

A conventional pervaporation system, besides being designed with, for example, one stage or two stages, is also subject to other constraints. The membrane area, module configuration (that is number, shape and arrangement of modules), heating/chilling capacity and pump and condenser capacity are decided according to the separation that the system is to carry out, specifically in response to such parameters as the feed composition, the target residue and permeate compositions and the feed flow rate. If any of these parameters changes, the effect on system performance can be significant. For example, suppose the system were designed to achieve 90% removal of an unwanted component present in 1% concentration in the feed. The residue would then contain an acceptable 0.1% of that component. If the feed concentration were to rise to 5%, the system would produce a residue containing 0.5%, an unacceptably high amount. To reduce the residue to 0.1% concentration would require one or more of:

(a) changing to a more selective membrane, if one were available, (b) changing the membrane area, (c) changing the module arrangement or module shape, (d) adding a second step to the existing membrane bank, (e) changing the heater and condenser capacity or position, and might also cause unacceptable dilution of the permeate.

Similar situations could arise, although the feed composition met the original specification for which the system was designed, if a change were made to the target specification of the residue or permeate stream.

Likewise, if the feed flow rate to the system were substantially below that for which the system was designed, the flow rate through the modules would also be low and concentration polarization could occur. In concentration polarization, portions of the feed, particularly those layers adjacent the membrane surface, become stagnant and, therefore, depleted in the preferentially permeating component, compared with the bulk of the feed solution. The membrane is exposed to an artificially low feed concentration and the separation performance may be seriously affected.

Another design consideration in a conventional system is the need to maintain an adequate driving force for membrane permeation. A convenient mathematical method of describing pervaporation is to divide the separation into two steps. The first is evaporation of the feed liquid to form a hypothetical saturated vapor phase on the feed side of the membrane. The second is permeation of this vapor through the membrane to the low pressure permeate side of the membrane. Although no evaporation actually takes place on the feed side of the membrane during pervaporation, this approach is mathematically simple and is thermodynamically completely equivalent to the physical process.

Transport through the membrane is induced by the partial pressure difference. However, the feed solution becomes depleted in the preferentially permeating component as the feed flows along the modules. At the residue end of the modules, the feed side vapor pressure is at its lowest, and may not be able to be maintained above the permeate side pressure, which is determined by the vapor pressure of the combined permeate portions collected along the length of the permeate side of the membrane. This is always a design issue in pervaporation systems, which operate with a relatively small transmembrane pressure difference compared with other membrane separations. It is a particular problem if the permeate forms two phases, one of which is a concentrated phase of the preferentially permeating component. In this case, the partial pressure of the vapor above this phase remains constant, while the partial vapor pressure on the feed side drops continuously. The system design must take this phenomenon into account to provide for an adequate transmembrane driving force based on the original specifications. Changing any of the starting parameters may make it impossible to provide a positive driving force at all positions along the membrane modules.

All of the above problems are ameliorated or eliminated by the apparatus and processes of the invention. It is simple to change either the residue composition or the permeate composition, or both, by varying the duration of the operations within the processing cycle. For example, if a residue concentration of 0.1% was previously acceptable, but now the residue concentration must be reduced to 0.05%, then this can be done by increasing the time during which the feed is circulating in the pervaporation unit/process tank loop. If the feed composition changes, this can also be adjusted for by changing the timing of operations within the processing cycle.

The problem associated with loss of transmembrane driving force along the modules disappears. In a conventional system, the permeate side partial pressure is averaged over the length of the modules. In the apparatus and processes of the invention, the feed may be continuously circulated through the process tank/pervap unit loop at a relatively high velocity. This means that concentration polarization problems can be reduced or eliminated. It also means that the gradients in feed and permeate side partial pressure along the module length that occur in conventional pervaporation can be avoided. The feed and permeate partial pressures both fall over time, rather than over module length, so the transmembrane driving force can be maintained constant or near constant. If the permeate that is first generated is sufficiently concentrated that it splits into two phases, then the permeate side partial pressure will not fall steadily but will stay constant while two permeate phases are present. However, by the time the partial pressure on the feed side has dropped to a level at which this would be a problem, the permeate concentration will also have dropped, the permeate then produced will be a single phase and the permeate side and feed side partial pressures will fall together as described above.

Based on the discussion above, it may be seen that the processes and systems of the invention offer advantages, even if the system never has to operate as anything but a one-stage system. Having only one, one-stage system that can handle different feed compositions, different residue and permeate target compositions and different feed flow rates, by means of controlled process schemes such as those described and illustrated, brings flexibility and convenience that cannot be achieved with conventional pervaporation.

Feedstreams treatable using the apparatus and process of the invention may be found throughout industry. A few representative, non-limiting, examples include:

1. Wash waters from a pharmaceutical plant: Pharmaceutical plants use acetone and water to clean batch reactors. Typically, the acetone concentration in the wash stream may vary from 2 to 30%, averaging about 5–10%, at a volume of 100–200 gal/day. To make acetone recovery viable, concentration of the acetone to greater than 50% is required. Simultaneously, reduction of the acetone concentration in the discharge stream to less than 1,000 ppm, and preferably to less than 100 ppm, is needed.

2. Ethylene dichloride reactor condensates: A vinyl chloride plant typically produces 4,000 gal/day of reactor condensate stream containing 8,000 ppm ethylene dichloride. This ethylene dichloride could be reused in the plant if it could be recovered at 95%+purity. The wastewater stream discharged from the plant should contain less than about 100 ppm ethylene dichloride.

3. Filter manufacturer's effluent: During the production of membrane cartridge filters, a manufacturer might produce a 2,000 gal/day waste stream containing 2.0 wt % dioxane, 0.6 wt % acetone and 0.1 wt % ethanol. Many sewer districts require the solvent levels to be reduced to less than 0.1 wt % dioxane, 0.05 wt % acetone and 0.01 wt % methanol before discharge. The concentration in the solvent stream must often be increased to more than 30% for solvent recycling.

4. Brewery slops: Suppose a brewery produces 15,000 gal/day of beer slops, containing 2.5 wt % ethanol and 1.5 wt% dissolved solids, from its bottling lines. The brewery needs to reduce the BOD content of the stream. A process that can produce a>50 wt% ethanol stream suitable for ethanol recovery, while reducing the

13 ethanol content of the discharge stream to 0.5% or less, is needed.

5. Methyl ethyl ketone (MEK): MEK is widely used in industry as a solvent in paint and varnish formulations. During storage, this solvent frequently becomes contaminated with water at levels up to about 1 wt%. A process that could remove this water to a level of 0.01% or less would be useful.

6. Waste solvent mixtures: Mixtures of acetone and methanol are often found in the chemical processing industry. Separation of the mixture is difficult by conventional distillation techniques because these solvents produce an azeotrope at 88% acetone. A pervaporation process is needed to separate the methanol from the mixture, leaving an acetone-rich residue that can be treated by distillation.

The scope of the invention is not intended to be limited to any particular streams, but to encompass any streams containing components that are theoretically separable by pervaporation. Dilute and concentrated streams may be treated. Representative components that may be separated from the feedstream by the apparatus and process of the invention include, but are not limited to, water, phenols, toluenes, benzenes, xylenes, cresols, esters, such as ethyl acetate or butyl acetate, chlorinated hydrocarbons, such as perchloroethylene, trichloroethylene, trichloroethane, chlorinated fluorocarbons, ketones, such as methyl ethyl ketone, alcohols, such as butanol, hexanol or octanol, naphthas and aliphatic hydrocarbons, such as hexane, octane or decane, or terpenes, such as those found in various wood product streams.

EXAMPLES

Examples 1–5 show how the pervaporation apparatus and processes of the invention can be used to carry out separations equivalent to a two-stage system, a two-step system, a one-stage system plus decanter, a one-stage system plus distillation and a modified one-stage system plus decanter.

EXAMPLE 1

Figure 10:
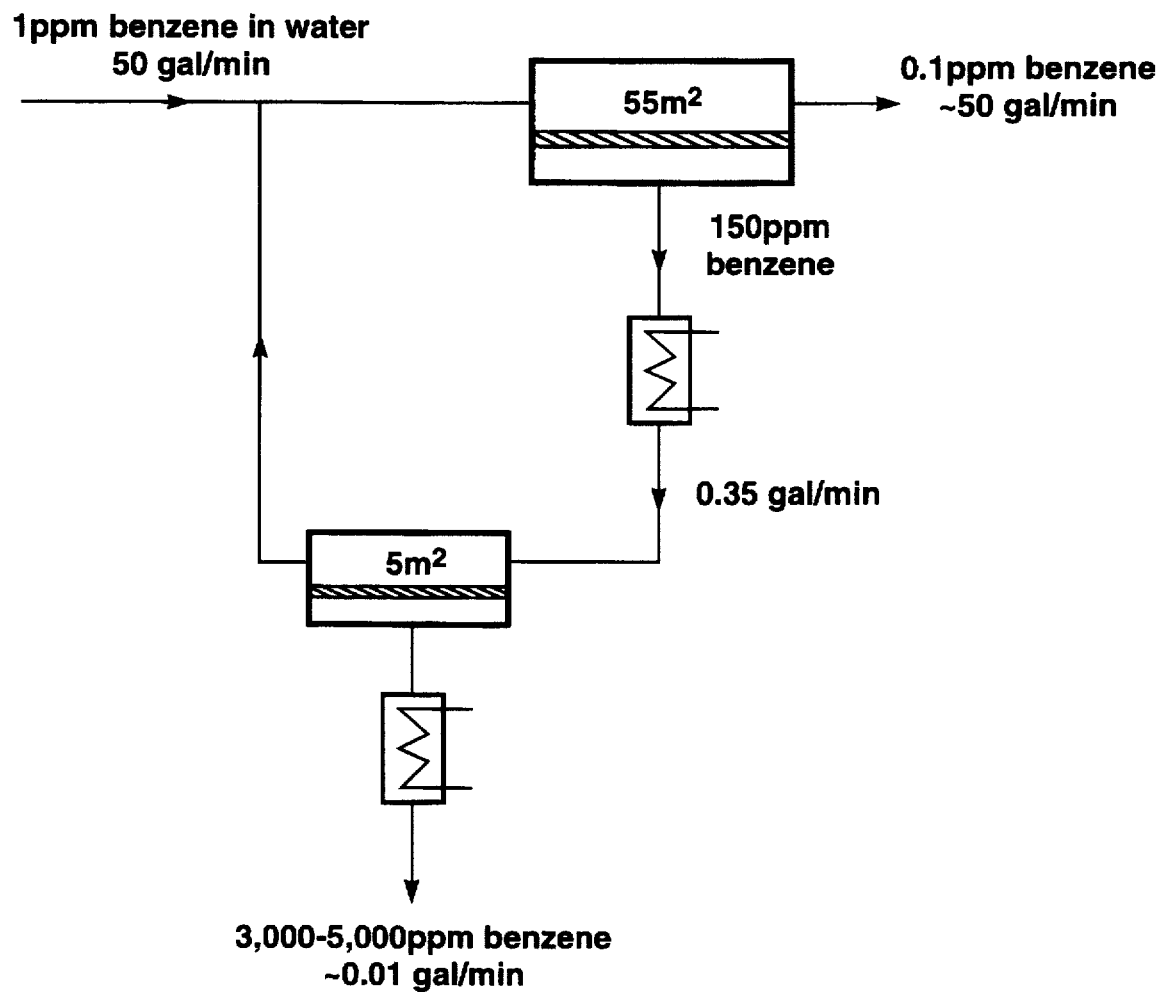
FIG. 10 is a schematic showing the arrangement and performance of a two-stage pervaporation system.

The performance of a two-stage pervaporation system in treating 50 gal/min of feed solution containing 1 ppm benzene in water was calculated. The system was assumed to contain silicone rubber membranes, with a benzene/water separation factor of about 200 and a transmembrane flux of 1–2 L/m².h. The membrane areas needed for a two-stage system and the compositions and flow rates of the various streams are shown in FIG. 10. The same permeate and residue compositions can be obtained using the process scheme of FIG. 6 and a standard pervaporation apparatus as shown in FIGS. 1 or 2 having a membrane area of 100 m². The time control sequence to achieve this result was calculated and found to be as follows:

| | |
|---|---|
| First Operation: | |
| Transfer from holding tank to process tank: | 5 min |
| Second Operation: | |
| Main pervaporation step: | 110 min |
| Third Operation: | |
| Secondary pervaporation step: | 10 min |
| Fourth Operation: | |
| Transfer of residue from third operation from | 5 min |

14
-continued

| | |
|---|---|
| second process tank to holding tank: | |
| Drain: | |
| Discharge of treated feed solution: | 5 min |
| Total Treatment Cycle Time: | 135 min |

A system of this size could handle a feed flow of 50 gal/min, including time for the draining and filling operations, in 62% of its total operating time capacity.

EXAMPLE 2

Figure 11:
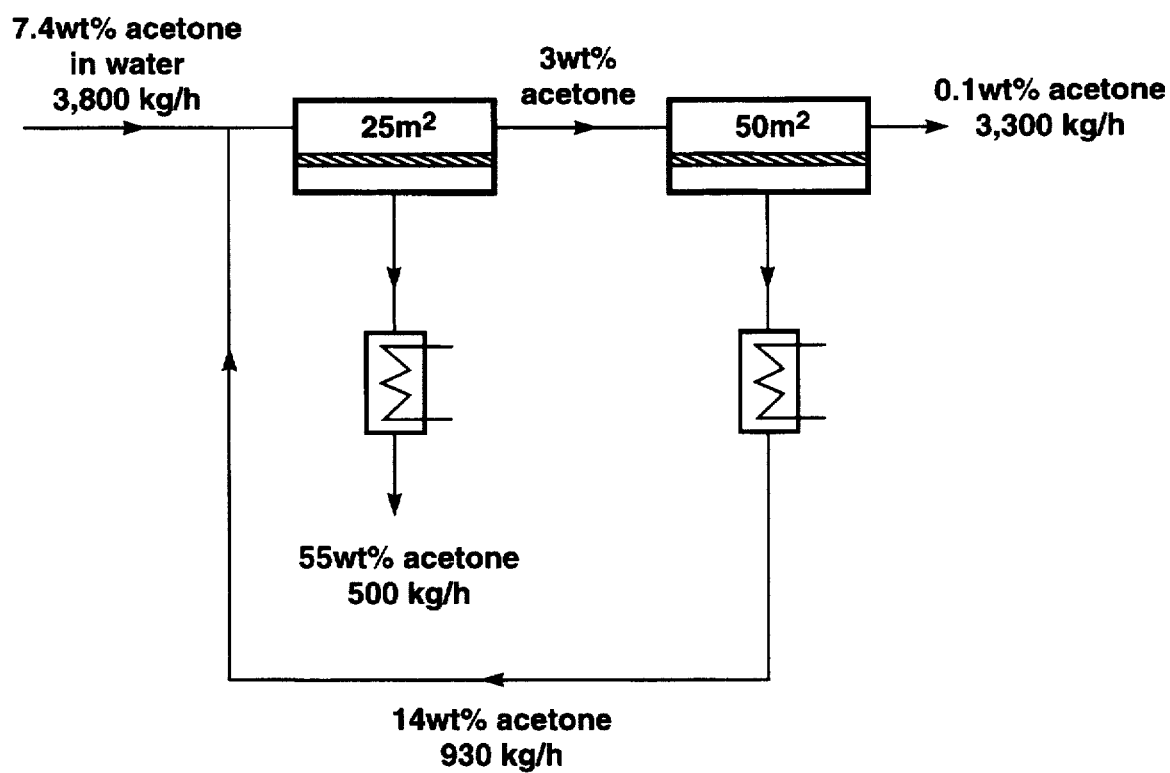
FIG. 11 is a schematic showing the arrangement and performance of a two-step pervaporation system.

The performance of a two-step pervaporation system in treating 3,800 kg/h of feed solution containing 7.4 wt% acetone in water was calculated. The system was again assumed to contain silicone rubber membranes, with an acetone/water separation factor of approximately 10 and a transmembrane flux of 1–2 L/m².h. The membrane areas needed for a two-step system and the compositions and flow rates of the various streams are shown in FIG. 11.

The same permeate and residue compositions can be obtained using the process scheme of FIG. 5 and a standard pervaporation apparatus as shown in FIGS. 1, 2, 3 or 4 and having a membrane area of 100 m². The time control sequence to achieve this result was calculated and found to be as follows:

| | |
|---|---|
| First Operation: | |
| Transfer from holding tank to process tank: | 5 min |
| Second Operation: | |
| First pervaporation step: | 50 min |
| Third Operation: | |
| Second pervaporation step: | 100 min |
| Fourth Operation: | |
| Discharge of treated feed solution: | 5 min |
| Total Treatment Cycle Time: | 160 min |

A system of this size could handle a feed flow of 3,800 kg/h, including time for the various draining and filling operations, in about 80% of its total operating time capacity.

EXAMPLE 3

Figure 12:
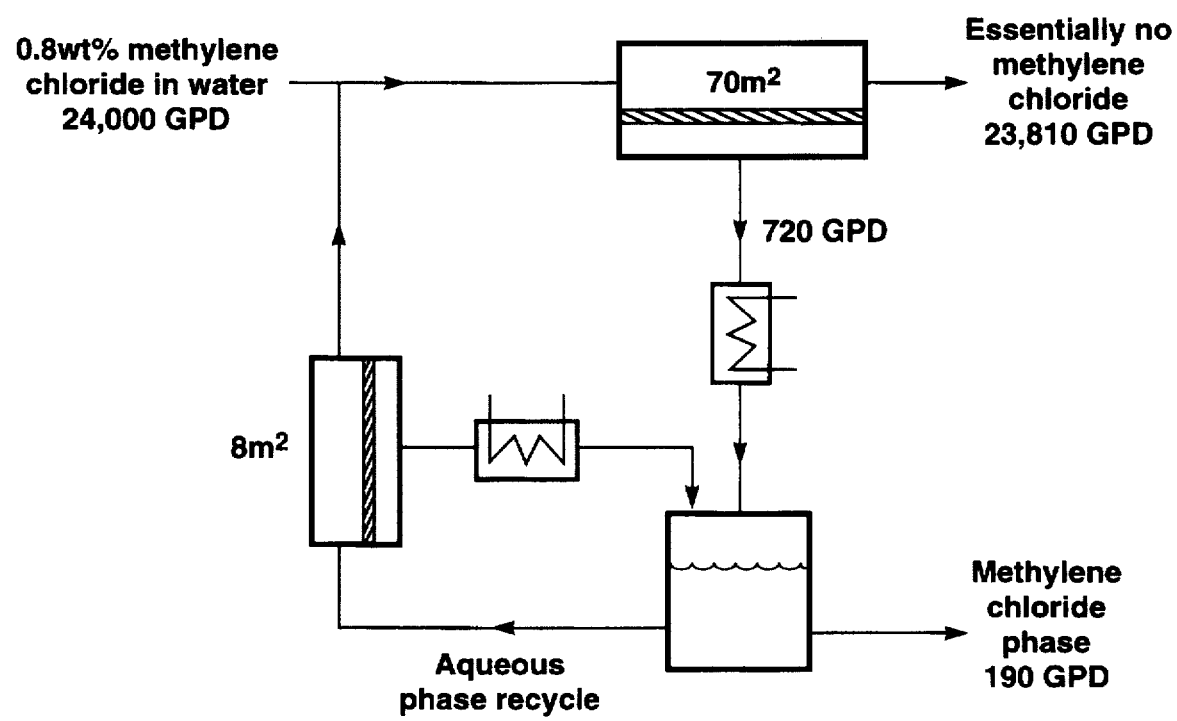
FIG. 12 is a schematic showing the arrangement and performance of a one-stage, plus auxiliary stage, pervaporation system with a decanter.

The performance of a one-stage pervaporation system fitted with a decanter and an auxiliary set of modules to treat the saturated aqueous phase from the decanter, as shown in FIG. 12, was calculated. The system is designed to treat a 24,000 gpd stream containing 0.8% methylene chloride in water. This is a stream typical of many contaminated with chlorinated hydrocarbons that are found throughout industry. The system was assumed to contain silicone rubber membranes, with a methylene chloride/water separation factor of at least 100 and a transmembrane flux of 1–2 L/m².h. The membrane areas needed for the main and auxiliary modules, and the compositions and flow rates of the various streams, are shown in FIG. 12.

The same product stream compositions can be obtained using the process scheme of FIG. 9 and a standard pervaporation apparatus as shown in FIGS. 1 or 2, having a membrane area of 100 m², plus a decanter attached to the condenser. The time control sequence to achieve this result was calculated and found to be as follows:

| First Operation: | |
|---|---|
| Transfer from holding tank to process tank: | 5 min |
| Second Operation: | |
| Main pervaporation step: | 68 min |
| Third Operation: | |
| Secondary pervaporation step on saturated aqueous phase from decanter: | 8 min |
| Fourth Operation: | |
| Transfer of residue from third operation from second process tank to holding tank: | 5 min |
| Drain: | |
| Discharge of treated feed solution: | 5 min |
| Total Treatment Cycle Time: | 91 min |

A system of this size could handle a feed flow of 24,000 gpd, including time for the various draining and filling operations, in about 90% of its total operating time capacity.

EXAMPLE 4

Figure 13:
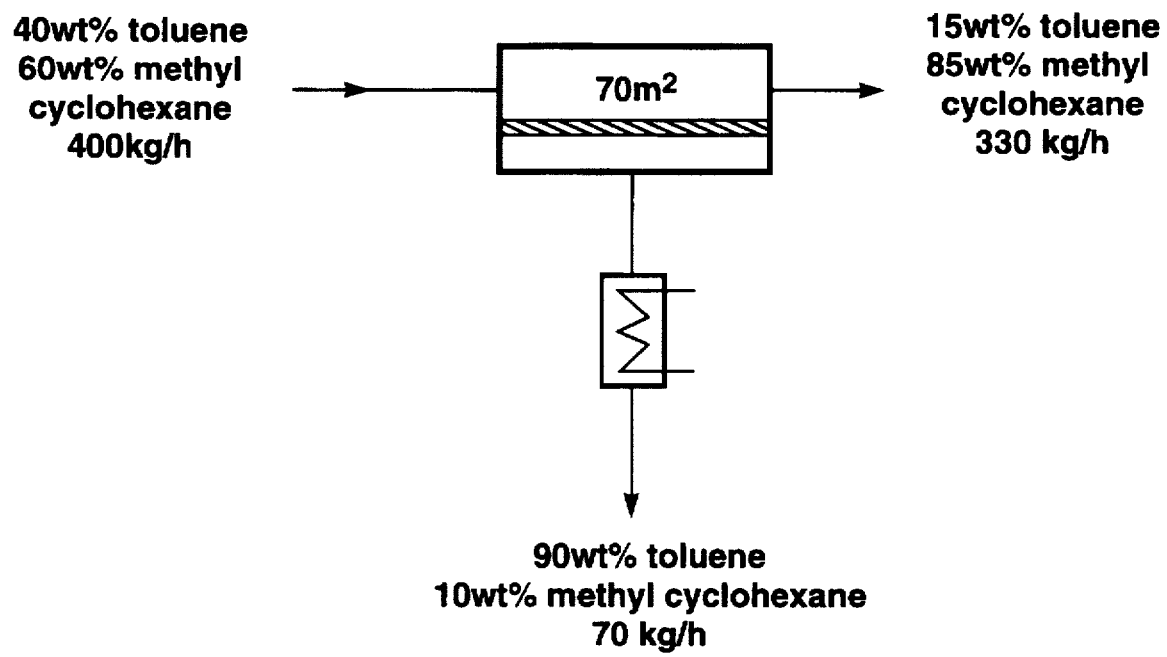
FIG. 13 is a schematic showing the arrangement and performance of a one-stage pervaporation system.

The performance of a one-stage pervaporation system in separating 400 kg/h of feed solution consisting of a mixture of toluene and methyl cyclohexane was calculated. The system was assumed to contain a (polyether-polyamide)/cellulose acetate composite membrane, with a toluene/methyl cyclohexane separation factor of approximately 7 and a transmembrane flux of 1 kg/m$^2$.h. The membrane area needed for a one-stage system and the compositions and flow rates of the various streams are shown in FIG. 13. The system separates the feed stream into a toluene-rich stream and a methyl cyclohexane-rich stream, both of which are much more easily separated by distillation than the original feed mixture.

The same permeate and residue compositions can be obtained using the process scheme of FIG. 7 and a standard pervaporation apparatus as shown in FIGS. 1, 2, 3 or 4 and having a membrane area of 100 m$^2$. The time control sequence to achieve this result was calculated and found to be as follows:

| First Operation: | |
|---|---|
| Transfer from holding tank to process tank: | 5 min |
| Second Operation: | |
| Pervaporation step: | 180 min |
| Third Operation: | |
| Discharge of treated feed solution: | 5 min |
| Total Treatment Cycle Time: | 190 min |

A system of this size could handle a feed flow of 400 kg/h, including time for the various draining and filling operations, in about 78% of its total operating time capacity.

EXAMPLE 5

Figure 14:
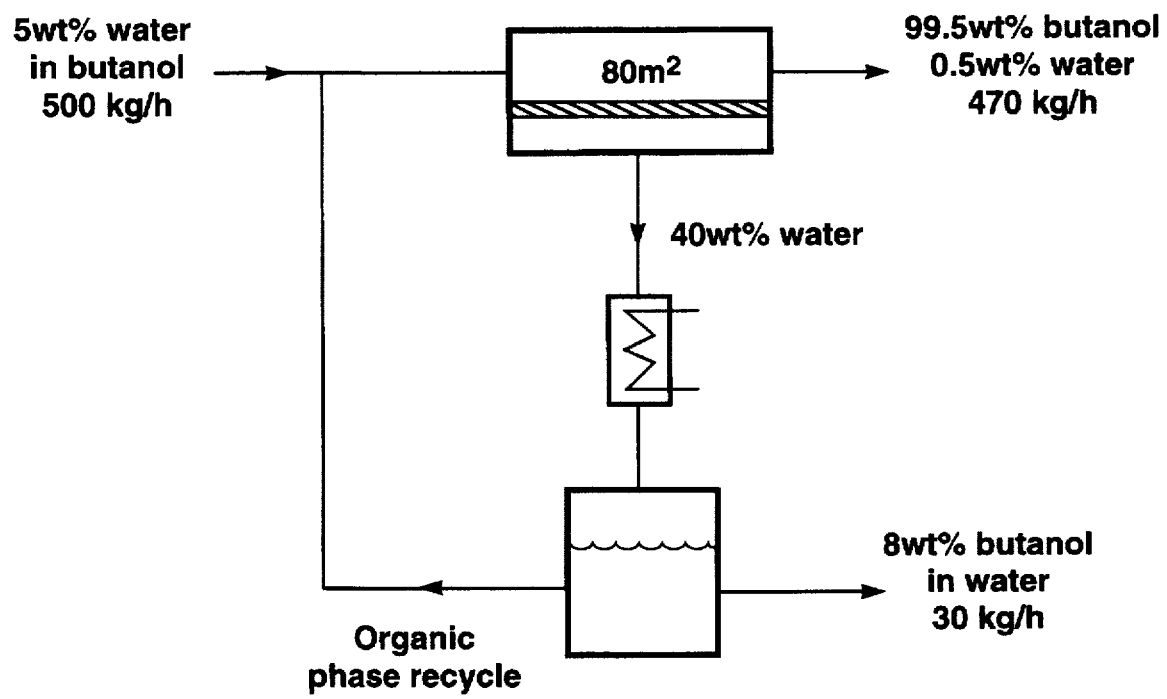
FIG. 14 is a schematic showing the arrangement and performance of a one-stage pervaporation system with a decanter.

The performance of a one-stage pervaporation system fitted with a decanter in separating 500 kg/h of feed solution containing 5 wt% water in butanol was calculated. The system was assumed to contain a polyamide membrane, with a water/butanol separation factor anywhere in the range 10–200 and a transmembrane flux of about 1 kg/m$^2$.h. The membrane removes approximately 90% of the water contained in the feed solution producing a concentrated permeate that is sent to a decanter, which yields an aqueous stream suitable for disposal and a butanol stream that can be returned to the membrane unit for reprocessing. The membrane area needed for the one-stage system and the compositions and flow rates of the various streams are shown in FIG. 14.

The same product stream compositions can be obtained using the process scheme of FIG. 8 and a standard pervaporation apparatus as shown in FIGS. 1 or 2, having a membrane area of 100 m$^2$, plus a decanter attached to the condenser. The time control sequence to achieve this result was calculated and found to be as follows:

| First Operation: | |
|---|---|
| Transfer from holding tank to process tank: | 5 min |
| Second Operation: | |
| Pervaporation step: | 160 min |
| Third Operation: | |
| Discharge of treated feed solution: | 5 min |
| Total Treatment Cycle Time: | 170 min |

A system of this size could handle a feed flow of 500 kg/h, including time for the various draining and filling operations, in about 85% of its total operating time capacity.

EXAMPLE 6

This example compares the performance of a conventional, one-stage pervaporation system and the process-controlled system of the invention in handling the separation of a solution containing a sparingly soluble component. Benzene in water was chosen as a representative solution. The following assumptions were made:

| Composition of feed solution: | 100 ppm benzene in water |
|---|---|
| Feed solution temperature: | 60° C. |
| Condenser temperature: | 15° C. |
| Membrane separation factor: | 200 |
| Solubility of benzene in water | 2,000 ppm |

Using these assumptions and the known vapor pressures of benzene and water at 15° C. and 60° C., the performance of the two types of systems was compared. In the case of the conventional system, the vapor pressure above the permeate liquid in the condenser will remain constant at the saturation vapor pressure at 15° C. of 9.4 kPa, because the condensed permeate solution will consist of two phases: a benzene phase saturated with water and a water phase saturated with benzene. Meanwhile, the vapor pressure on the feed side drops as the feed solution becomes depleted in benzene. Thus the driving force for membrane permeation diminishes progressively. The calculated feed pressures, permeate pressures and pressure differences are shown in Table 1.

TABLE 1

| Feed | | Permeate | | |
|---|---|---|---|---|
| Concentration (ppm benzene) | Vap. press. (kPa) | Concentration (ppm benzene) | Vap. press. (kPa) | Press. Diff (kPa) |
| 10 | 20.4 | >2,000 | 9.4 | 11.0 |
| 5 | 20.2 | >2,000 | 9.4 | 10.8 |
| 2 | 20.0 | >2,000 | 9.4 | 10.6 |
| 1 | 19.9 | >2,000 | 9.4 | 10.5 |

In the case of the system of the invention, the vapor pressure above the liquid in the condenser will also be 9.4 kPa initially, since the first vapor drawn through the membrane will also form two phases upon condensing. However, as the benzene concentration in the circulating feed solution drops, the permeate concentration will also drop toward the 2,000 ppm, one-phase, level. This occurs when the feed solution concentration has dropped to about 10 ppm. If the process is continued further, the permeate pressure falls below 9.4 kPa. The calculated feed pressures, permeate pressures and pressure differences are shown in Table 2.

TABLE 2

| Feed | | Permeate | | |
| --- | --- | --- | --- | --- |
| Concentration (ppm benzene) | Vap. press. (kPa) | Concentration (ppm benzene) | Vap. press. (kPa) | Press. Diff (kPa) |
| 10 | 20.4 | 2,000 | 9.4 | 11.0 |
| 5 | 20.2 | 1,000 | 5.5 | 14.7 |
| 2 | 20.0 | 400 | 3.3 | 16.7 |
| 1 | 19.9 | 200 | 2.5 | 17.4 |

Comparison of Tables 1 and 2 shows that, in conventional pervaporation, the driving force for pervaporation diminishes as the feed flows along the membrane surface. In contrast, the driving force for pervaporation actually increases over time in the apparatus and processes of the invention. These effects are particularly marked when dilute feed solutions are to be handled. If the feed concentration is below 10 ppm, the process of the invention is significantly better in sustaining a good driving force than conventional pervaporation.

We claim:

1. A pervaporation process carried out using an apparatus, said apparatus comprising in combination:

a pervaporation unit, including at least one membrane having a feed side and a permeate side;

a process tank, connected to said feed side to form a loop, such that liquid can circulate in said loop across said feed side and through said process tank;

a condenser, having an inlet and outlet, said inlet being connected to said permeate side;

a holding tank, connected to said process tank such that liquid is transferrable between said holding tank and said process tank;

means for removing liquid from said loop;

means for removing liquid from said outlet;

controlling means for controlling fluid flows within said apparatus, said means providing, in conjunction with the manner in which said pervaporation unit, process tank, holding tank, condenser and outlet are connected together, a flexibility of operation such that said apparatus can function in a variety of pervaporation processing modes, thereby achieving a variety of processing results.

2. The process of claim 1, wherein said controlling means comprises a set of valves whose operation is controlled by a programmable controller.

3. The process of claim 1, wherein said controlling means comprises a set of valves whose operation is controlled by an electronic controller.

4. The process of claim 1, wherein said controlling means comprises a set of valves whose operation is controlled by an electromechanical controller.

5. The process of claim 1, wherein said controlling means comprises a set of valves whose operation is controlled by a mechanical controller.

6. The process of claim 1, wherein said controlling means comprises a set of automatic valves.

7. The process of claim 1, wherein said controlling means comprises a set of manually operated valves.

8. The process of claim 1, wherein said controlling means is activated by one or more sensors, connected to said process tank to monitor the concentrations of liquids therein.

9. The process of claim 1, wherein said controlling means is activated by one or more level switches, connected to said process tank to monitor the volume of liquids therein.

10. The process of claim 1, wherein said controlling means is time activated.

11. The process of claim 1, wherein said process produces at least one two-phase permeate mixture upon condensation and wherein said two-phase mixture is subjected to decantation.

12. The process of claim 1, wherein said apparatus further comprises a concentrate tank connected to said outlet such that liquid is transferrable from said outlet to said concentrate tank.

13. The process of claim 1, wherein said apparatus further comprises a second process tank connected to said feed side to form a second liquid loop, such that liquid is transferrable to and from said feed side, and connected to said outlet such that liquid is transferrable from said outlet to said second process tank.

14. The process of claim 13, wherein said apparatus further comprises a concentrate tank connected to said outlet such that liquid is transferrable from said outlet to said concentrate tank.

15. The process of claim 1, wherein said pervaporation process comprises removing an organic compound from water.

16. The process of claim 1, wherein said pervaporation process comprises removing water from an organic compound.

17. The process of claim 1, wherein said pervaporation process comprises separating a mixture of organic compounds.

18. The process of claim 1, wherein said processing results, as measured by the composition of residue and permeate products, are equivalent to those achieved by a two-step pervaporation system.

19. The process of claim 1, wherein said processing results, as measured by the composition of residue and permeate products, are equivalent to those achieved by a two-stage pervaporation system.

* * * * *